United States Patent
Narayanan et al.

(10) Patent No.: US 6,299,744 B1
(45) Date of Patent: Oct. 9, 2001

(54) HYDROGEN GENERATION BY ELECTROLYSIS OF AQUEOUS ORGANIC SOLUTIONS

(75) Inventors: Sekharipuram R. Narayanan, Arcadia; William Chun, Alhambra; Barbara Jeffries-Nakamura, San Marino; Thomas I. Valdez, Covina, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/123,957

(22) Filed: Jul. 28, 1998

Related U.S. Application Data

(63) Continuation of application No. 08/926,947, filed on Sep. 10, 1997, now abandoned.

(51) Int. Cl.$^7$ .................................................... C25D 7/00
(52) U.S. Cl. .................. 204/263; 204/265; 204/266; 204/282; 204/283; 429/33
(58) Field of Search .................................. 205/638, 615, 205/637, 639; 204/263, 266, 282, 283; 429/33

(56) References Cited

U.S. PATENT DOCUMENTS

| | | | |
|---|---|---|---|
| 3,013,098 | 12/1961 | Hunger | 136/86 |
| 3,143,440 | 8/1964 | Hunger et al. | 136/89 |
| 4,011,149 * | 3/1977 | Nozik | 204/129 |
| 4,085,709 | 4/1978 | Tangri | 123/1 A |
| 4,175,013 * | 11/1979 | Barnert et al. | 204/129 |
| 4,248,941 * | 2/1981 | Louis et al. | 429/13 |
| 4,257,856 * | 3/1981 | Beni et al. | 204/129 |
| 4,390,603 | 6/1983 | Kawana et al. | 429/30 |
| 4,465,570 * | 8/1984 | Oda et al. | 204/129 |
| 4,594,297 * | 6/1986 | Polak et al. | 429/13 |
| 4,699,700 * | 10/1987 | Dhooge | 204/105 |
| 5,037,518 * | 8/1991 | Young et al. | 204/230 |
| 5,394,852 * | 3/1995 | McAllister | 123/494 |
| 5,513,600 * | 5/1996 | Teves | 123/3 |
| 5,592,028 * | 1/1997 | Pritchard | 290/55 |
| 5,599,638 | 2/1997 | Surampudi et al. | 429/33 |
| 5,800,938 * | 9/1998 | Watanabe | 429/30 |
| 5,840,172 * | 11/1998 | Zugravu | 205/639 |

FOREIGN PATENT DOCUMENTS

| | | |
|---|---|---|
| 59-209277 | 11/1984 | (JP). |
| 60-165062 | 8/1985 | (JP). |
| 63076264 | 6/1988 | (JP). |
| 2148657 | 11/1988 | (JP). |

OTHER PUBLICATIONS

Kosek et al., A Direct Methanol Oxidation Fuel Cell, American Chemical Surgery 11209–11214 (Aug. 8, 1993).

Hamnett et al., Electrocatalysis and the Direct Methanol Fuel Cell, Chemistry & Industry, No. 13 480–483 (Jul. 6, 1992).

Narayanan et al., Implications of Fuel Crossover in Direct Methanol Fuel Cells Abstract No. 73 pp. 126–127 (1993), No month available.

Narayanan et al., Studies on the Electo–Oxidation of Methanol and Formaldehyde at Carbon–Supported Platinum and Platinum Alley Electrodes pp. 78–79 (1992), No month available.

* cited by examiner

*Primary Examiner*—Kishor Mayekar
(74) *Attorney, Agent, or Firm*—Fish & Richardson P.C.

(57) ABSTRACT

A device for electrolysis of an aqueous solution of an organic fuel. The electrolyte is a solid-state polymer membrane with anode and cathode catalysts on both surfaces for electro-oxidization and electro-reduction. A low-cost and portable hydrogen generator can be made based on the device with organic fuels such as methanol.

25 Claims, 4 Drawing Sheets

HYDROGEN GENERATION BY ELECTROLYSIS OF AQUEOUS ORGANIC SOLUTIONS

This is a continuation of U.S. application Ser. No. 08/926,947 filed Sep. 10, 1997, now abandoned.

ORIGIN OF THE INVENTION

The invention described herein was made in the performance of work under a NASA contract and is subject to the provisions of Public Law 96-517 (35 U.S.C. 202) in which the Contractor has elected to retain title.

FIELD OF THE INVENTION

The present invention relates to generation of hydrogen by electrolysis of aqueous organic solutions, and more specifically to an electrolysis system with a solid electrolyte membrane cell for producing hydrogen.

BACKGROUND OF THE INVENTION

Hydrogen is known to have many applications ranging from synthesis of chemicals such as ammonia, petroleum refining in producing high octane gasoline and aviation jet fuel and in removal of sulfur, hydrogenation in various industrial processes, to propellant fuels in combination with oxygen or fluorine for rockets and spacecraft. Pure hydrogen usually takes a form of a colorless, odorless, and tasteless gas composed of diatomic molecules, $H_2$, under ordinary conditions. Alternatively, pure hydrogen may also be stored in the liquid phase under a certain pressure. Pure hydrogen is usually produced by producing the hydrogen gas.

One conventional method of producing the hydrogen gas is by electrolysis of water. This is a simple process in which water ($H_2O$) is decomposed into hydrogen ($H_2$) and oxygen ($O_2$) by electrochemical reactions at the electrodes in an electrolytic cell. The cost of hydrogen generation by electrolysis of water is mainly determined by the cost of energy consumption since the cost of equipment diminishes over many production cycles. The energy consumption in an electrolysis process can be indicated by the operating voltage applied to the electrodes in the electrolytic cell. In ordinary operating conditions, the higher the operating voltage, the larger the energy consumption. A typical operating voltage for electrolysis of water is approximately about 1.4 Volt or higher.

Due to the simplicity of electrolysis process and the equipment, conventional water-based electrolysis systems are widely used in portable or stationary hydrogen generators for small and large scale hydrogen generation. Specifically, hydrogen generation devices can be used as fuel supply for fuel cells that generate electricity by consuming hydrogen.

SUMMARY OF THE INVENTION

The inventors recognized that it could be useful to produce hydrogen based on devices using an alternative fuel. The present disclosure describes an alternative electrolysis system for producing hydrogen. According to a first aspect of the invention, an aqueous organic solution, rather than water, is used in an electrolytic cell for producing the hydrogen gas. A preferred organic solution is the type having an operating voltage lower than that of the water in an electrolysis process. Use of this type of organic solutions reduces the energy consumption and therefore the cost of the generated hydrogen gas.

According to one embodiment of the invention, a preferred organic solution is methanol, $CH_3OH$. The electrolysis of methanol to hydrogen and carbon dioxide can occur at a low operating voltage of about 0.4 V. This may lead to a significant reduction in energy consumption of more than 70% compared to electrolysis of water. The cost of hydrogen produced by using the present invention, including the cost of the methanol, may be about 50% of the usual amount of hydrogen produced by the electrolysis of water.

Another aspect of the invention is the construction of the electrolytic cell. A preferred cell has an integrated membrane-electrode assembly which includes two catalyzed electrodes each bonded to one side of a solid proton-conducting polymer membrane. The solid polymer serves as the electrolyte. One advantage of the solid membrane electrolytic cell is elimination of the conventional liquid acidic or alkaline electrolyte which can cause various problems including corrosion of cell components, poor activity of catalysts, and parasitic shunt currents. The solid membrane electrolytic cell can also be made robust and compact.

Yet another aspect of the invention is a power generation system having a hydrogen fuel cell and a hydrogen generator based on electrolysis of an organic fuel.

BRIEF DESCRIPTION OF THE DRAWINGS

These and other features and advantages of the present invention will become more apparent in light of the following detailed description, as illustrated in the accompanying drawings, in which.

DETAILED DESCRIPTION OF THE INVENTION

Figure 1:
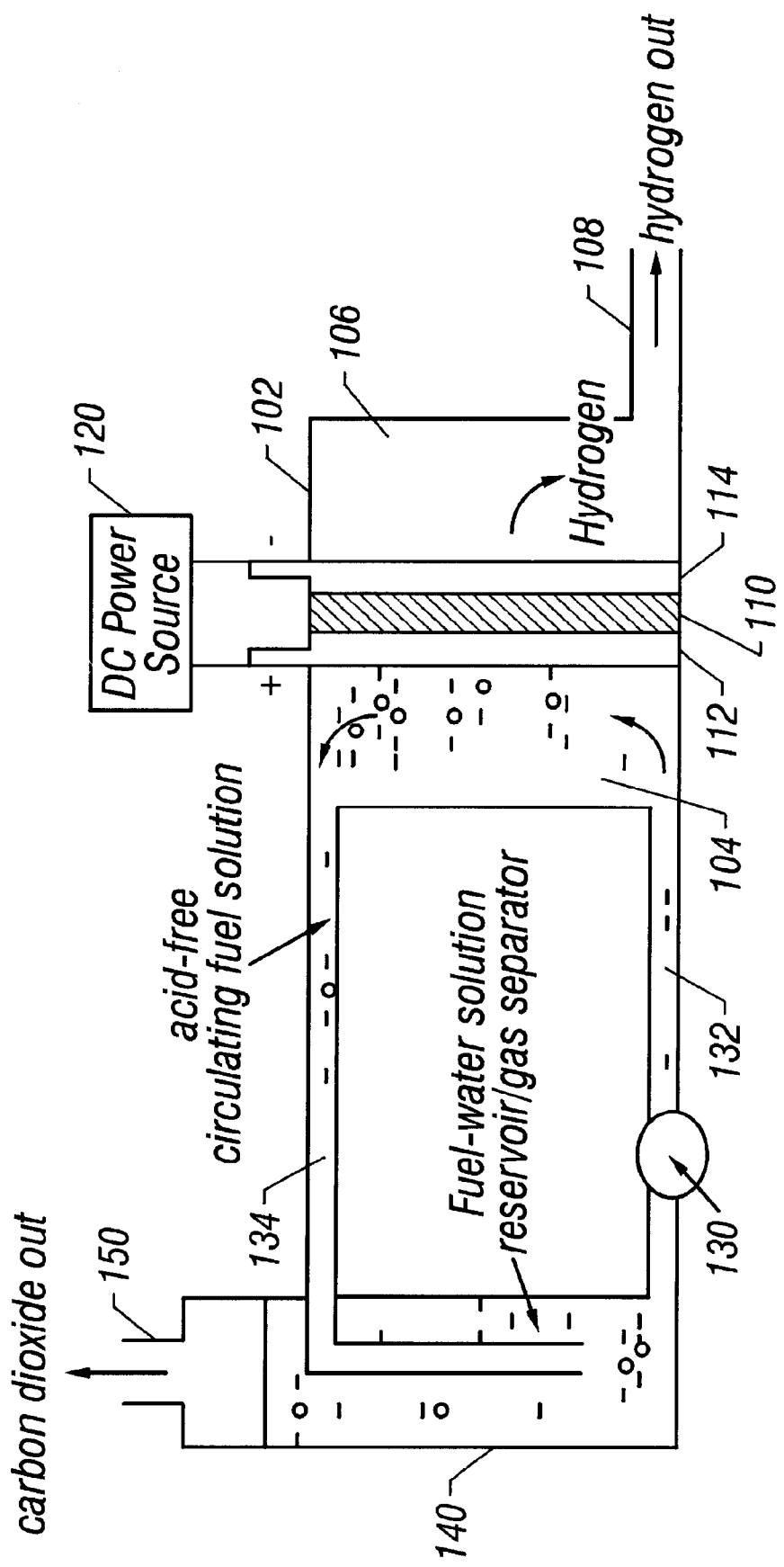
FIG. 1 is a schematic illustration showing one embodiment of an electrolysis cell having a solid-state membrane electrolyte.

FIG. 1 shows a hydrogen generator 100 having a solid-state membrane electrolyte according to the invention. An electrolytic cell 102 encloses an electrolyte membrane 110 which is operable to conduct protons and exchange cations. An anode 112 is formed on a first surface of the membrane 110 with a first catalyst for electro-oxidation and a cathode 114 is formed on a second surface thereof opposing the first surface with a second catalyst for electro-reduction. A DC electrical power supply 120 is connected to the anode 112 with its positive output terminal and cathode 114 with its negative output terminal. A DC voltage is applied on the electrodes during operation so that a current suppled by the power supply 120 flows from the anode 112 towards the cathode 114.

The membrane 110 divides the electrolytic cell 102 into an anode chamber 104 on the side of the anode 112 and a cathode chamber 106 on the side of the cathode 114. The anode chamber 104 of the electrolytic cell 102 is connected to a feeding conduit 132 for feeding an organic solution to the anode 112 from a reservoir and a circulation conduit 134 for sending the organic solution from the anode chamber 104 to the reservoir 140. A fluid pump 130 can be deployed anywhere in the circulation path of the fluid, for example, in the feeding conduit 132 as shown in FIG. 1. A gas outlet 150 is located in the reservoir 140 for releasing gas. Alternatively, the gas outlet 150 may be located in the anode chamber 104 of the electrolytic cell 102.

The cathode chamber 106 of the electrolytic cell 102 confines the hydrogen gas generated at the cathode 114. A gas feed port 108 in the cathode chamber 106 is used to export the hydrogen gas.

In operation, a mixture of an organic fuel (e.g., methanol) and water is fed into the anode chamber 104 of the electrolytic cell 102. Electrochemical reactions happen simultaneously at both the anode 112 and cathode 114 by consuming the electrical energy supplied by the power supply 120. The electro-oxidation of the organic fuel at the anode 112 produces hydrogen ions, H$^+$ (i.e. protons), that migrate to the cathode 114 due to the difference in the electrical potentials of the electrodes. At the cathode 114, the protons are further reduced to hydrogen molecules (H$_2$) by electro-reduction.

For example, when methanol is used as the fuel, the electro-oxidation of methanol at the anode 112 can be represented by $$CH_3OH + H_2O \rightarrow CO_2 + 6H^+ + 6e^-.$$

The protons (H$^+$) generated at the anode 112 traverse through the proton conducting membrane 110 to the cathode 114 and the electrons, also generated at the anode 112, are conducted through the electrical wires and the power supply 120 to the cathode 114. The hydrogen ions and the electrons are combined at the cathode 114 through electro-reduction of protons to generate the hydrogen gas:

$$6H^+ + 6e^- \rightarrow 3H_2.$$

Hence, the overall electrolytic reaction in the hydrogen generator is:

$$CH_3OH + H_2O + \text{Electrical Energy} \rightarrow CO_2 + 3H_2.$$

The carbon dioxide gas (CO$_2$) produced at the anode 112 is released through the gas outlet port 150 as a by-product and the hydrogen gas is exported through the port 108.

Various of organic fuels may be used. Preferably, organic fuels with low thermodynamic potential for electrolysis are used to achieve low operating voltages. This reduces the electricity expense in the hydrogen generation.

The inventors discovered than methanol has a low operating voltage for electrolysis. A theoretically estimated operating voltage for electrolyzing methanol in the system 100 is about 0.02 V. However, the electrolysis of methanol occurs at about 0.3 V in a practical hydrogen generator based on the system 100. This operating voltage is considerably lower than what is necessary for electrolyzing water, e.g., about 1.4 V in a conventional water-based system for hydrogen production.

Other fuels may also be used in accordance with the invention, for example, dimethoxymethane, trimethoxymethane, and trioxane. These materials are generally referred to herein as methanol compounds with a structure of (CH$_3$)$_n$OH. Formaldehyde and formic acid can also be used.

The electrode-membrane assembly ("MEA") formed by the electrodes 112 and 114 and the polymer membrane 110 has a significant impact on the efficiency of the hydrogen generator 100. Some aspects of the electrode-membrane assembly have been disclosed elsewhere by the inventors, for example, U.S. Pat. No. 5,599,638, U.S. patent application Ser. Nos. 08/569,452 filed on May 28, 1996 now U.S. Pat. No. 5,773,162 and 08/827,319 filed on Mar. 26, 1997 now U.S. Pat. No. 5,945,231, the disclosures of which are incorporated herein by reference. The brevity in describing various parts of the present invention is supplemented by the disclosure of the above references.

In a preferred implementation, the membrane 110 is formed from Nafion™, a perfluorinated proton-exchange membrane material. Nafion™ is a co-polymer of tetrafluoroethylene and perfluorovinylether sulfonic acid. Other membrane materials can also be used, for example, modified perflourinated sulfonic acid polymers, polyhydrocarbon sulfonic acid, and composites of two or more kinds of proton exchange membranes. Different materials with carboxylic acid groups may also be used for constructing membranes. In addition, polystyrene sulfonic acid ("PSSA") and poly (vinylidene fluoride) ("PVDF") may also be used.

The maintenance of high proton conductivity of the membrane 110 is important to the efficiency of the hydrogen generator 100. The thickness of the proton-conducting solid polymer electrolyte membranes may be in a range from about 0.05 mm to about 0.5 mm. Membranes thinner than about 0.05 mm may result in membrane electrode assemblies which are poor in mechanical strength, while membranes thicker than about 0.5 mm may suffer damaging dimensional changes induced by swelling of the polymer by the liquid fuel and water solutions and also exhibit excessive resistance. The ionic conductivity of the membranes should be greater than 1 ohm$^{-1}$ cm$^{-1}$ to have a tolerable internal resistance.

A membrane may be formed with various methods. The following is an example of making a membrane with the Nafion 117 from DuPont. Nafion 117 is first cut to the proper size. Proper sizing is important, since the end materials will be conditioned. First, the Nafion 117 is boiled in a hydrogen peroxide solution with a concentration about 5% for approximately 1 hour in a temperature ranging from about 80° C. to 90° C. This removes any oxidizable organic impurities. Following this peroxide boiling step, the membrane is boiled in de-ionized water, at about 100° C., for approximately 30 minutes. Hydrogen peroxide adsorbed into the membrane is removed along with other water-soluble organic materials from the membrane.

Next, the above-processed membrane is boiled in a sulfuric acid solution. A one-molar solution of sulfuric acid is prepared by diluting commercially available 18-molar concentrated ACS-grade sulfuric acid. The ACS-grade sulfuric acid preferably has metal impurities in an amount less than 50 parts per million. The membrane is boiled in the 1-molar sulfuric acid at about 100° C. to more completely convert the material into a proton conducting form.

The processed material is subsequently boiled in de-ionized water at about 90–100° C. for approximately thirty minutes. The water is discarded, and this boiling step may be repeated three more times to purify the membrane.

After the above washings, the membrane should be substantially free of sulfuric acid and in completely "protonic" form. The membrane is stored in de-ionized water in a sealed container ready for further processing.

The anode 112 can be formed from a catalyst, a proton-conducting ionomer such as Nafion solution, and hydrophobic additives such as Teflon, and water. Typical catalyst loading levels used are in the range of 0.5–4 mg/cm$^2$. Lower loading of catalyst in the range of 0.1–1.0 mg/cm$^2$ of the catalyst also allows attainment of useful performance levels. The catalyst can be a platinum-ruthenium alloy particles either as fine metal powders, i.e. "unsupported", or dispersed on high surface area carbon, i.e. "supported". The high surface area carbon may be a material such as Vulcan XC-72A from Cabot Inc., USA. A carbon fiber sheet backing can be used to make electrical contact with the particles of the electrocatalyst. Carbon papers (e.g., Toray™ paper) or carbon cloth can be used as the electrode backing sheet. A supported alloy electrocatalyst on a Toray™ paper backing is available from E-Tek, Inc., of Framingham, Mass. Alternatively, both unsupported and supported electrocatalysts may be prepared by chemical methods, combined with Teflon™ binder and spread on Toray™ paper backing to produce the anode.

Platinum-based alloys in which a second metal is either tin, iridium, osmium, or rhenium can be used instead of platinum-ruthenium. In general, the choice of the alloy depends on the fuel to be used in the fuel cell. Platinum-ruthenium is preferable for electro-oxidation of methanol. For platinum-ruthenium, the loading of the alloy particles in the electrocatalyst layer is preferably in the range of from about 0.5 to about 4.0 mg/cm$^2$. Generally, lower loading of electrocatalyst in the range of 0.1 to 0.5 mg/cm$^2$ also allows attainment of useful performance levels. However, more efficient electro-oxidation can be realized at higher loading levels, rather than lower loading levels.

Various experiments carried out by the inventors have ascertained that one particular preferred catalyst material is platinum-ruthenium ("Pt—Ru"). Various formulations allowing combination of those two metals are possible. The inventors found that a bimetallic powder, having separate platinum particles and separate ruthenium particles produced a better result than a platinum-ruthenium alloy. The preferred Pt—Ru material used according to the present invention has a high surface area to facilitate contact between the material and the fuels. Both platinum and ruthenium are used in the catalytic reaction, and the inventors found that it was important that the platinum and ruthenium compounds be uniformly mixed and randomly spaced throughout the material, i.e., the material should be homogeneous.

Different metals may be combined to form a platinum-ruthenium bimetallic powder which has distinct sites of different materials. However formed, the extent of combination between the particles is preferably kept at a minimal level so that the active catalyst powder has a homogeneous mixture of submicron size platinum particles and ruthenium particles.

Additives may be added to the above catalyst powder to improve the electrolysis efficiency, including titanium dioxide ($TiO_2$), rhodium (Rh), iridium (Ir), and osmium (Os).

Further processing of this anode catalyst by combining with Nafion solution, etc. results in an "ink". The inventors have found the preferred ratio of platinum to ruthenium can be between 60/40 and 40/60. The best performance is believed to occur at 60% platinum, 40% ruthenium. Performance degrades slightly as the catalyst becomes 100% platinum. It degrades more sharply as the catalyst becomes 100% ruthenium.

The inventors believe that platinum-ruthenium catalyzes the electro-oxidation of methanol by aiding in disassociating the materials on the catalyst surface. The material draws the electrons out, and allows them to disassociate. The reaction can be explained as follows.

Methanol is a carbon compound. The carbon atom is bound to four other atoms. Three of the bonds are to hydrogen atoms. The other bond is to a hydroxyl, OH, group. The platinum is believed to disassociate methanol from its hydrogen bonds to form M=C—OH+3H$^+$, where M is the Pt or other metal site catalyst. The ruthenium disassociates the hydrogen from the water molecule (HOH) to form Ru—OH. These surface species then reassemble as $CO_2$+6H$^-$+6e$^-$. The H$^+$ (protons) are produced at the anode, and cross the anode to the cathode where they are reduced. This is called a bifunctional catalyst.

Any material which has a similar function of disassociating the methanol and water as described may be used in place of the platinum. The inventors have investigated several such materials and found alternatives to platinum, including but not limited to, palladium, tungsten, Rhodium, Iron, Cobalt, and Nickel which are capable of dissociating C—H bonds. Molybdenum oxide ($MoO_3$), niobium oxide ($Nb_2O_5$) and zirconium oxide ($ZrO_2$) may also be capable of dissociating H—OH as M—OH. A combination of these are therefore good catalysts. The catalyst for dissociating the H—O—H bonds preferably includes Ru, Ti, Os, Ir, Cr, and/or Mn.

Ruthenium may be replaced either wholly or partly by a ruthenium-like material. The inventors found that iridium has many characteristics which are similar to ruthenium. An embodiment of this aspect, therefore, uses a combination of platinum, ruthenium and iridium in the relative relationship 50-25-25. This adds the salt $H_2IrCl_6$ to the initial materials described above, in appropriate amounts to make a 50-25-25 (Pt—Ru—Ir) combination. It has been found that this catalyst also operates quite well, using less ruthenium. Alternatively, ruthenium can be replaced by tin to form a platinum-tin catalyst.

Another material which has been found to have some advantages is materials containing titanium compounds. Any titanium alkoxide or titanium butoxide, e.g. titanium isopropoxide or $TiCl_4$—can also be added to the original mixture. This forms an eventual combination of platinum-ruthenium-$TiO_2$, also formed in a 50-25-25 (Pt—Ru—$TiO_2$) combination.

Platinum-ruthenium-osmium can also be used. Osmium is added to the mixture as a salt $H_2OsCl_6$ which has also been found to produce advantageous properties.

Pt and Ru can be incorporated in zeolites and clays to form zeolite-based Pt—Ru or Pt—Ru—Ir catalysts by exploiting the acid catalytic properties of these materials. Also, Pt cation complexes (e.g., amine chlorides) and similar ruthenium complexes can be exchanged with zeolite material (ZSM, mordenites, etc.) and they can be treated with hydrogen at elevated temperatures (200–300° C.) to produce activated Pt—Ru catalysts with large surface area. These will reduce cost of catalysts for oxidation of methanol.

Other materials may also be used as a catalyst for oxidation of methanol. For example, a combination of Pt and zirconium oxide can be used as a catalyst. This may be prepared by an impregnation technique. The zirconium oxide is produced by a hydrolysis process from zirconium chloride or zirconyl nitrate solution. The platinum salt such as the chloride or nitrate is added to it in desired quantities and sonicated until complete dissolution of the platinum salt occur and the platinum is uniformly distributed. A reducing agent such as formaldehyde and sodium formate is then added and the solution thereof is heated. Pt will deposit on the zirconium oxide.

The cathode 114 can be formed from a cathode catalyst, a proton-conducting ionomer such as Nafion solution, and hydrophobic additives such as Teflon and water. The cathode 114 can be a gas diffusion electrode in which platinum or palladium particles are bonded to the second surface of the membrane 110. The cathode 114 can use both unsupported and supported platinum/palladium. Unsupported platinum/palladium black available from Johnson Matthey Inc., USA or supported platinum/palladium materials available from E-Tek Inc., USA are suitable for the cathode. As with the anode, the cathode metal particles are preferably mounted on a carbon backing material. The loading of the electrocatalyst particles onto the carbon backing is preferably in a range of about 0.5–4.0 mg/cm$^2$. Although higher loadings may increase the oxidation, lower loading of catalyst in a range of 0.1–1.0 mg/cm$^2$ may also be used to achieve useful performance levels.

One way to construct the cathode 114 is by first preparing a cathode catalyst ink. The cathode catalyst ink is preferably pure platinum or palladium, although other inks can be used and other materials can be mixed into the ink. For example, 250 mg of platinum catalyst is mixed with 0.5 gram of water including 37½ mg of Teflon. The mix is sonicated for five minutes and combined with a 5% solution of Nafion. The mix is again sonicated for five minutes to obtain a uniform dispersal. This forms enough material to cover one piece of 2×2" carbon paper. Unprocessed Toray carbon paper can be used without being teflonized. However, preferably the material is teflonized as discussed above. The procedures are followed to make a 5% Teflon impregnated paper. The paper is then heated at about 300° C. for one hour to sinter the Teflon particles. Catalyst ink is then applied to the paper as described above to cover the material with 4 mg/cm$^2$/g of Pt. Teflon content of the paper can vary from 3–20%, 5% being the preferred.

An alternative technique of forming the cathode 114 is by a sputtering process to form a sputtered platinum electrode. This sputtered platinum electrode has been found to have significant advantages when used as a plain air electrode.

The inventors further contemplate that a decal layer having a layer of catalyst on a substrate (e.g., Teflon) can be used for forming a catalyst layer onto a proton conducting membrane. The catalyst layer is first formed on the substrate from a pre-formed catalyst ink and subsequently transformed onto a membrane. This is described in detail in the above-incorporated U.S. patent application Ser. No. 08/827,319 filed on Mar. 26, 1997. Decal transfer can be used for forming both the anode and cathode of an electrolytic cell.

Referring to FIG. 1, the membrane-electrode assembly ("MEA") can be formed by assembling the anode 112, the membrane 110, and the cathode 114 together through a hot pressing process.

The electrodes and the membrane are first laid or stacked on a CP-grade 5 Mil, titanium foil (e.g., 12-inch by 12-inch). The titanium foil prevents any acid content from the membrane 110 from leaching into the foil.

First, the anode electrode 112 is laid on the foil. The proton conducting membrane 110 has been stored wet to maintain its desired membrane properties. The membrane 110 is first mopped dry to remove the macro-sized particles and then laid directly on the anode 112. The cathode 114 is next laid on top of the membrane 114. Another titanium foil is placed over the cathode 114. The edges of the two titanium foils are clipped together to hold the layers of materials in position. The titanium foil and the membrane between which the assembly is to be pressed includes two stainless steel plates which may be each approximately 0.25 inches thick.

The membrane and the electrode in the clipped titanium foil assembly is carefully placed between the two stainless steel platens. The two platens are held between jaws of a press such as an arbor press or the like. The press should be maintained cold, e.g. at the room temperature.

The press is then actuated to produce a pressure between 500 and 1500 psi, with 1250 psi being a preferred pressure. The pressure is maintained for about 10 minutes. Next, heating is commenced by slowly increasing the temperature to a range of 140–150° C. and preferably about 146° C. The slow process of increasing the temperature should take place over 25–30 minutes, with the last 5 minutes of heating being a time of temperature stabilization. The temperature is allowed to stay at about 146° C. for approximately 1 minute. At that time, the heat is switched off, but the pressure is maintained.

The press is then rapidly cooled using circulating water, while the pressure is maintained at about 1250 psi. When the temperature reaches 45° C., approximately 15 minutes later, the pressure is released. The bonded membrane and electrodes are then removed and stored in de-ionized water.

During operation of the cell, a fuel and water mixture (containing no acidic or alkaline electrolyte) in the concentration range of 0.5–3.0 mole/liter is circulated past anode 112 in the anode chamber 102. Preferably, flow rates in the range of 10–500 ml/min. are used.

In addition to undergoing electro-oxidation at the anode, a portion of the liquid fuel dissolved in water can permeate through solid polymer electrolyte membrane 110 without electro-oxidation. This phenomenon is termed "fuel crossover". Fuel crossover results in consumption of fuel without producing the hydrogen gas. It is therefore desirable to minimize the rate of fuel crossover.

The rate of crossover is proportional to the permeability of the fuel through the solid electrolyte membrane and increases with increasing concentration and temperature. By choosing a sold electrolyte membrane with low water content, the permeability of the membrane to the liquid fuel can be reduced. Reduced permeability for the fuel results in a lower crossover rate. Also, fuels having a large molecular size have a smaller diffusion coefficient than fuels which have small molecular size. Hence, permeability can be reduced by choosing a fuel having a large molecular size.

While water soluble fuels are desirable, fuels with moderate solubility exhibit lowered permeability. Fuels with high boiling points do not vaporize under normal operating temperatures and their transport through the membrane is in the liquid phase. Since the permeability for vapors is higher than liquids, fuels with high boiling points generally have a low crossover rate.

The concentration of the liquid fuel can also be lowered to reduce the crossover rate. With an optimum distribution of hydrophobic and hydrophilic sites, the anode structure is adequately wetter by the liquid fuel to sustain electrochemical reaction and excessive amounts of fuel are prevented from having access to the membrane electrolyte. Thus, an appropriate choice of anode structures can result in the high performance and desired low crossover rates.

As noted above, the membrane should have a low permeability to the liquid fuel. Although a Nafion™ membrane has been found to be effective as a proton-conducting solid polymer electrolyte membrane, per fluorinated sulfonic acid polymer membranes such as Aciplex™ (manufactured by Asahi Glass Co., Japan) and polymer membranes made by Dow Chemical Co., Japan) and polymer membranes made by Dow Chemical Co., USA, such as XUS13204.10 which are similar to properties to Nafion™ are also applicable. Membranes of polyethylene and polypropylene sulfonic acid, polystyrene sulfonic acid and other polyhydrocarbon-based sulfonic acids (such as membranes made by RAI Corporation, USA) can also be used depending on the temperature and duration of fuel cell operation. Composite membranes consisting of two or more types of proton-conducting cation-exchange polymers with differing acid equivalent weights, or varied chemical composition (such as modified acid group or polymer backbone), or varying water contents, or differing types and extent of cross-linking (such as cross linked by multivalent cations e.g., Al 3+, Mg 2+ etc.,) can be used to achieve low fuel permeability. Such composite membranes can be fabricated to achieve high ionic conductivity, low permeability for the liquid fuel and good electrochemical stability.

According to the invention, the permeability of the membrane can also be changed by processing the surface with zeolites. The zeolite structure with the appropriate pore size can be used to reduce the crossover of the fuel (e.g., methanol). Typically, zeolites such as Mol-six 3A, 4A, 5A from Union Carbide in the protonic form would be candidate materials. These protonic forms can be produced by standard methods of Ammonium ion exchange followed by calcining at about 550° C. in air. Such a calcined zeolite can be used in a number of ways, including:

a) mixed with the catalyst to fill the voids between the catalyst particles.

b) applied along with Nafion as a second layer on the electrode.

c) Combined with conductive carbon such as Shawanigan black or graphite and mixed in with Nafion ionomer to form a layer adjacent to the membrane electrolyte.

The Zeolite containing layer may be formed to increase the concentration/content of zeolite in the subsequent layers. This way, the catalyst utilization can be maintained without restricting the access to methanol to the catalyst. When the methanol attempts to enter the membrane, the zeolite particles will suppress such a transport. Zeolite as a "crossover inhibitor" is preferable to inert materials such as Teflon because Zeolites in the protonic form offer some ionic conductivity. This approach can be integrated with the aforementioned zeolite supported metal catalysts. A mixture of zeolite catalyst and zeolite crossover inhibitor may be applied.

As can be appreciated from the foregoing description, the hydrogen generator 100 of FIG. 1 uses the proton-conducting solid polymer membrane 110 as electrolyte without the need for a free soluble acid or base electrolyte. Thus, the only electrolyte is the proton-conducting solid polymer membrane 110. No acid is present in free form in the liquid fuel and water mixture. This avoids acid-induced corrosion of cell components.

Such cell construction offers considerable flexibility in the choice of materials for the electrolytic cell 102 and the associated sub-systems. Furthermore, unlike cells which contain potassium hydroxide as liquid electrolyte, cell performance does not degrade because soluble carbonates are not formed. A solid electrolyte membrane also minimizes parasitic shunt currents.

The inventors built a special hydrogen generator based on the preferred configuration 100 using a methanol-water solution. The methanol concentration in the aqueous solutions can be in a range of about 0.1 M to about 8 M. The special hydrogen generator has a Nafion™ membrane suitable for operation in a temperature range of about 5–120° C. A platinum-ruthenium catalyst is used on the anode so that the only by-product of the electro-oxidation of methanol is carbon dioxide. The cathode has a platinum catalyst. The catalyst loadings for both electrodes may be about 1–4 mg/cm$^2$.

Figure 2:
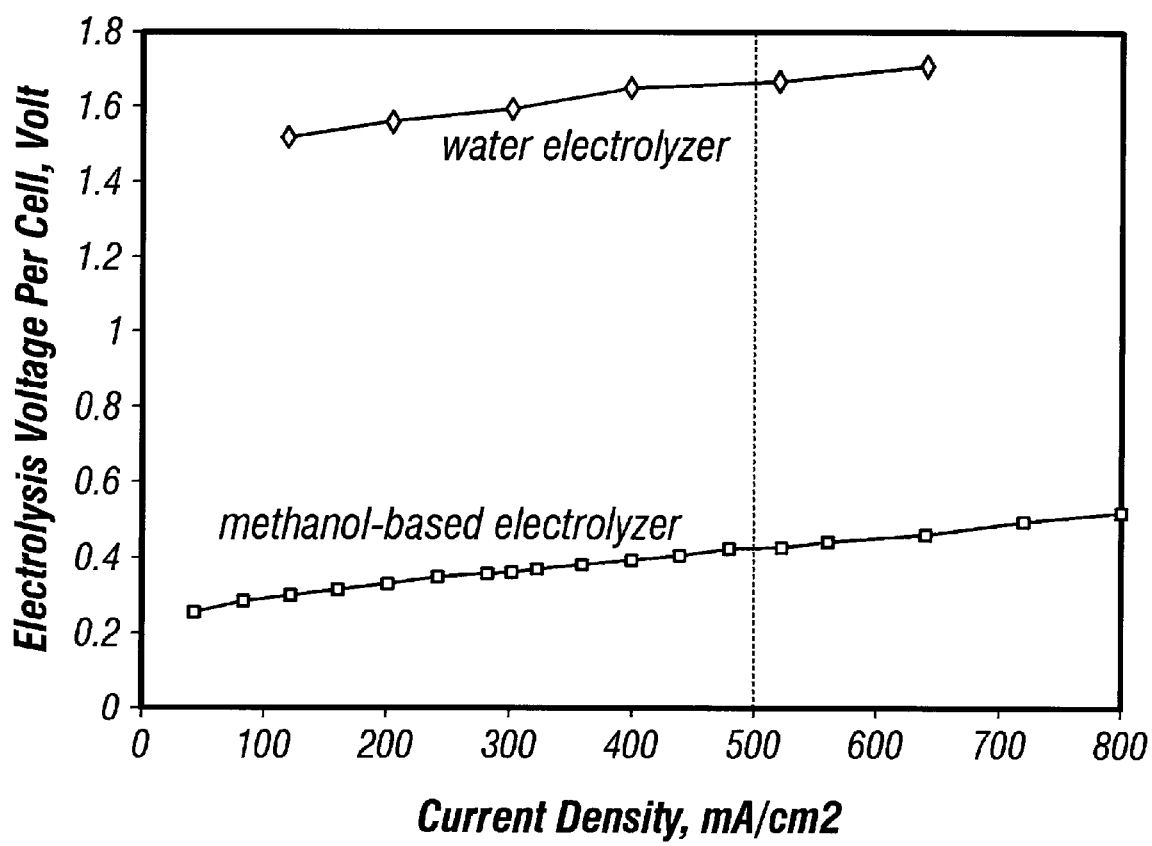
FIG. 2 is a chart of typical electrolysis voltage per cell as a function of current density for a special hydrogen generator in accordance with the preferred system of FIG. 1.

One way to evaluate the efficiency of electrolysis is the electrolysis voltage of a single electrolytic cell as a function of the driving current. FIG. 2 shows the measured current voltage profile 210 for the methanol-based electrolytic cell in the special system. Measurements from a commercial water electrolyzer are also included as a curve 220 for comparison. Current densities as high as 800 mA/cm$^2$ can be attained at about 0.5 V. This is approximately one-third of the voltage at which water electrolyzers operate under similar conditions. The high efficiency obtained in the special methanol-based system is in part due to the use of methanol and in part due to the membrane-electrode assembly in accordance with the invention.

Referring back to FIG. 1, the cathode chamber 106 may have methanol and water that traverses through the membrane-electrode assembly from the anode chamber 104. Although the impermeability of the membrane-electrode assembly can be improved according to the invention, complete impermeability is difficult to achieve with the currently available polymer materials for membranes. The methanol and water permeate through the membrane into the cathode chamber 106 mix with the generated hydrogen gas. Therefore, the hydrogen gas from the cathode chamber 106 usually needs to be purified by removing water and methanol contents.

Figure 3:
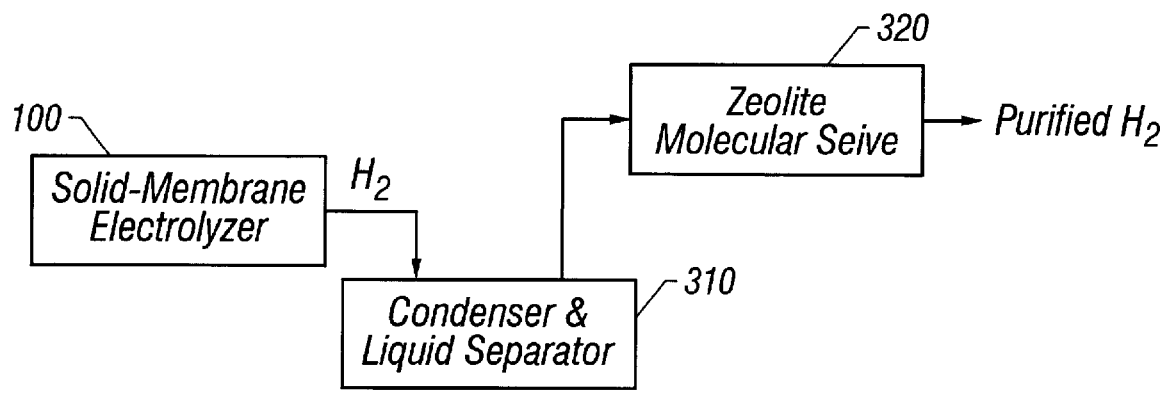
FIG. 3 is a schematic illustration of a scheme for purification of hydrogen.

FIG. 3 shows a purification system that can be incorporated into the system 100 of the invention. The hydrogen gas produced from the hydrogen generator 100 is guided to a vapor condenser/liquid separator 310 to remove the water and methanol. A selective molecular seive 320 is located down stream to further remove traces of methanol. The molecular seive 320 may have Molsiv 3X in the passage of the hydrogen gas, which allows only hydrogen to pass through and traps the methanol.

The electrolysis cell of the invention can be coupled to a solar cell or array to harness solar energy. By coupling hydrogen generation to solar cell-based electricity generators, high efficiency solar-powered hydrogen gas generation systems can be constructed which would operate with significantly lower energy requirements than state-of-the-art water electrolyzers being used today. Such a solar-powered hydrogen generator may be possible in part due to the high efficiency of the electrolysis of the electrolytic cell of the invention.

Figure 4:
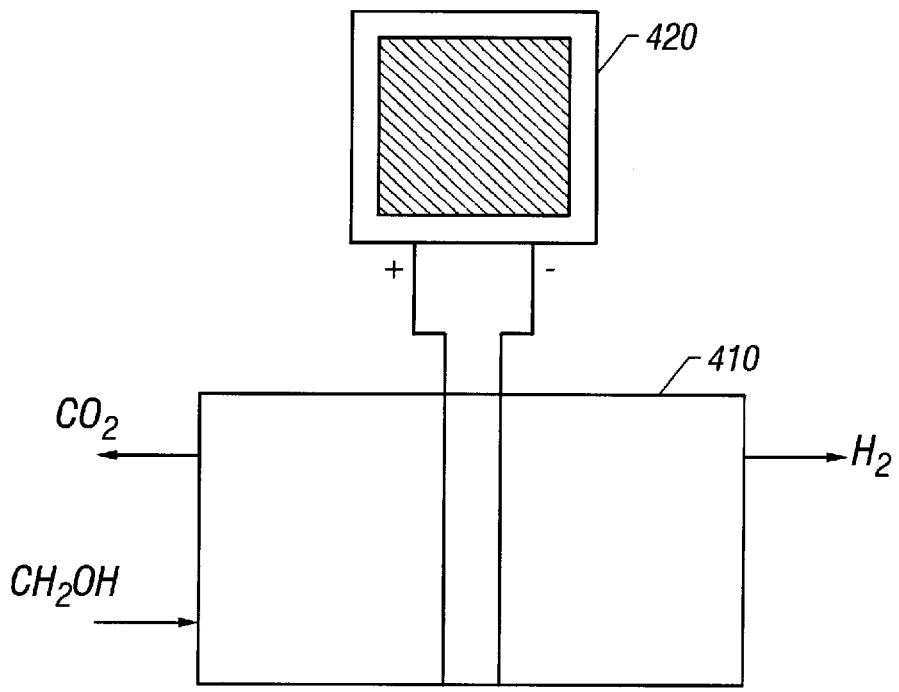
FIG. 4 is a schematic illustration showing another embodiment of an electrolysis cell having a solid-state membrane electrolyte and a solar array.

FIG. 4 shows one embodiment of this aspect of the invention. A solar array 420 with solar cells receives sunlight and generates DC electrical power to drive the electrolytic cell 410.

Multiple cell stacks of the device can be built using the conventional designs for the bipolar water electrolyzers.

The present invention can be used in a portable or stationary mode for small and large-scale hydrogen generation. The present market in this area is dominated by water-based electrolysis system. The on-site hydrogen generators can be used in metallurgical processes for annealing, reduction, alloy processing and so on. The small on-site hydrogen sources for gas chromatograph and flame ionization detectors in analytical laboratories is a significant niche market.

The automotive market can also use hydrogen in heavy tanks with several hazards of pressurized hydrogen. The hydrogen produced in such electrolytic generators has minimized carbon monoxide and can be used as the fuel for hydrogen/oxygen fuel cells for producing electrical energy.

Figure 5:
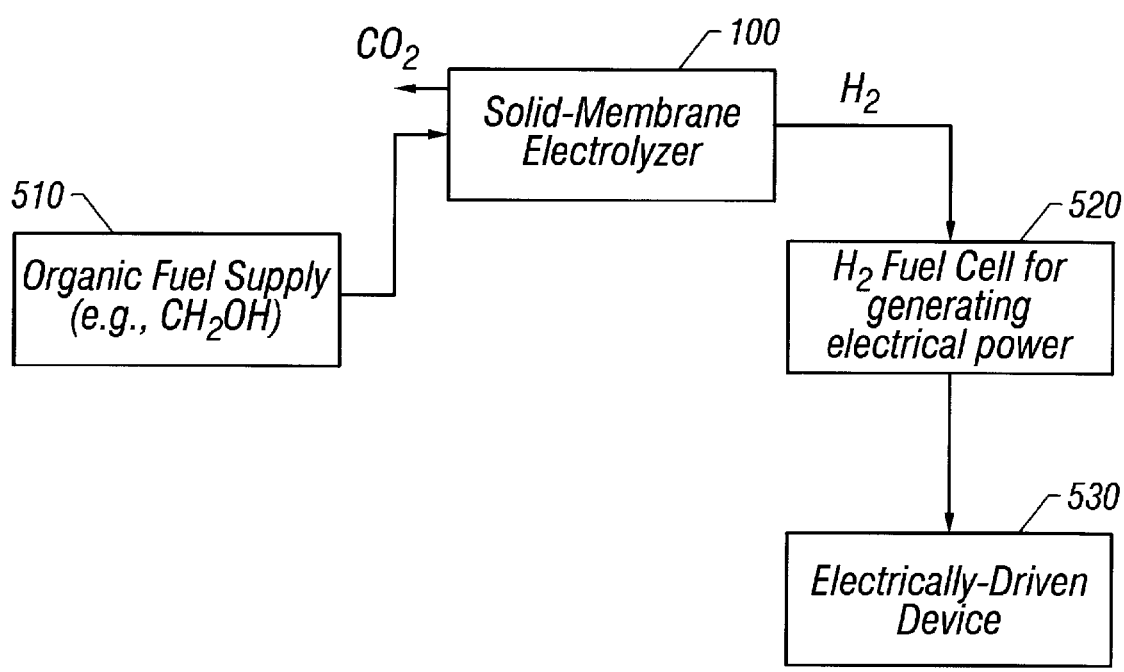
FIG. 5 shows an electrical power generator based on a hydrogen fuel cell and a solid-state membrane electrolysis cell.

FIG. 5 shows a power generation system using a hydrogen generator 100 and a hydrogen fuel cell 520. The hydrogen generator 100 supplies hydrogen as a fuel to the hydrogen fuel cell 520. The hydrogen fuel cell 520 is known in the art which consumes hydrogen to generate electricity. The electrical power from the fuel cell 520 can be used to power an electrically driven device 530. The entire system may be made as a mobile system which carries a fuel tank 510 to store a proper organic fuel such as methanol. The hydrogen generator 100 may be powered either by a battery or a solar cell. One application of such a system is electric vehicles based on hydrogen fuel cells wherein the electrically-driven device includes the engine and other electrical devices on the vehicles.

Although the present invention has been described in detail with reference to a few preferred embodiments, one ordinarily skilled in the art to which this invention pertains will appreciate that various modifications and enhancements may be made without departing from the scope and spirit of the present invention, which are further defined by the following claims.

What is claimed is:

1. An electrolysis cell comprising:
   a liquid organic fuel
   a housing having a reservoir holding the liquid organic fuel, an anode chamber configured to receive and circulate the liquid organic fuel from the reservoir, and a cathode chamber configured to collect hydrogen gas generated from electrolysis of the organic fuel;
   a solid electrolyte membrane having a anode and a cathode membrane surfaces, said membrane disposed in said housing and configured to partition said housing into said anode and cathode chambers, said membrane operable to conduct protons and exchange cations;
   an anode electrode formed on said anode membrane surface to interconnect said membrane and said anode chamber, said anode electrode operable to facilitate electro-oxidation of the organic fuel to generate protons;
   a cathode electrode formed on said cathode membrane surface to interconnect said membrane and said cathode chamber for electro-reduction of the protons to produce the hydrogen gas; and
   a DC power supply connected to said anode and cathode electrodes and operable to supply electrical power to said electro-oxidation and electro-reduction.

2. The electrolysis cell of claim 1 wherein said solid electrolyte membrane comprises a polymer material.

3. The electrolysis cell of claim 2 wherein said polymer material includes a perfluorinated proton-exchange membrane material.

4. The electrolysis cell of claim 3 wherein said polymer material includes a co-polymer of tetrafluoroethylene and perfluorovinylether sulfonic acid.

5. The electrolysis cell of claim 2 wherein said polymer material includes a modified perfluorinated sulfonic acid polymer or polyhydrocarbon sulfonic acid.

6. The electrolysis cell of claim 2 wherein said polymer material includes a carboxylic acid, polystyrene sulfonic acid ("PSSA"), or poly(vinylidene fluoride) ("PVDF").

7. The electrolysis cell of claim 1 wherein said solid electrolyte membrane has a thickness in a range between about 0.05 mm and about 0.5 mm.

8. The electrolysis cell of claim 1 wherein said solid electrolyte membrane has a ionic conductivity greater than about 1 ohm$^{-1}$ cm$^{-1}$.

9. The electrolysis cell of claim 1 wherein said anode electrode includes an anode catalyst, a proton-conducting sonomer, and a hydrophobic additive.

10. The electrolysis cell of claim 9 wherein said anode catalyst includes platinum.

11. The electrolysis cell of claim 10 wherein said anode catalyst further includes ruthenium.

12. The electrolysis cell of claim 11 wherein said anode catalyst further includes titanium dioxide, rhodium, iridium, or osmium.

13. The electrolysis cell of claim 10 wherein said anode catalyst further includes tin, iridium, osmium, or rhenium.

14. The electrolysis cell of claim 9 wherein said anode catalyst is applied with a loading approximately from 0.1 mg/cm$^2$ to 4.0 mg/cm$^2$.

15. The electrolysis cell of claim 9 wherein said anode catalyst includes palladium, tungsten, rhodium, iron, cobalt, nickel, molybdenum oxide ($MoO_3$), niobium oxide ($Nb_2O_5$), or zirconium oxide ($ZrO_2$).

16. The electrolysis cell of claim 1 wherein said cathode electrode includes a cathode catalyst, a proton-conducting sonomer, and a hydrophobic additive.

17. The electrolysis cell of claim 16 wherein said cathode catalyst includes platinum.

18. The electrolysis cell of claim 9 or claim 16, wherein said proton-conducting sonomer includes poly-co-(tetrafluoroethylene)-(perfluorovinylether sulfonic acid).

19. The electrolysis cell of claim 9 or claim 16, wherein said hydrophobic additive includes polytetrafluoroethylene.

20. The electrolysis cell of claim 1, wherein said DC power supply includes a solar cell.

21. The electrolysis cell of claim 1 wherein said organic fuel includes methanol, dimethoxymethane, trimethoxymethane, trioxane, formaldehyde, or formic acid.

22. The electrolysis cell of claim 1, further comprising a hydrogen purification device connected to said cathode chamber to receive the hydrogen gas, said hydrogen purification device operating to remove liquid from the hydrogen gas.

23. An electrical system, comprising:
   an electrolysis unit having an electrolysis cell which comprises a liquid organic fuel, a solid-state polymer electrolyte membrane, an anode and a cathode formed on opposing surfaces of said membrane, a reservoir holding the liquid organic fuel, an anode chamber configured to receive and circulate the liquid organic fuel from the reservoir, and a cathode chamber configured to collect hydrogen gas generated from electrolysis of the organic fuel; and
   an electrical power generating unit connected to said electrolysis unit and configured to receive said hydrogen gas from said electrolysis unit, said electrical power generating unit having a hydrogen fuel cell which consumes said hydrogen gas and produces electrical power.

24. A system as in claim 23, further comprising an electrically-driven device connected to said electrical power generating unit and configured to receive said electrical power therefrom.

25. A system as in claim 24, wherein said electrically-driven device is an electrical motor.

* * * * *